Aug. 29, 1939.   R. N. FEICHT   2,171,110
REFRIGERATING APPARATUS
Filed Sept. 4, 1937   2 Sheets-Sheet 1

INVENTOR.
ROBERT N. FEICHT.
BY
HIS ATTORNEYS.

Patented Aug. 29, 1939

2,171,110

UNITED STATES PATENT OFFICE 2,171,110

REFRIGERATING APPARATUS

Robert N. Feicht, Dayton, Ohio, assignor to General Motors Corporation, Dayton, Ohio, a corporation of Delaware Application September 4, 1937, Serial No. 162,509

4 Claims. (Cl. 211—151)

The present invention relates to refrigeration and particularly to food storage devices within the refrigerated chamber of a household refrigerator.

Devices have, prior to my invention, been proposed for storing in refrigerators small amounts of food products left over from the serving of one meal for reserving at a subsequent meal. For example, a track separate from and mounted on a food storage shelf of a refrigerator cabinet and containing a plurality of jars for the reception and storage of the food products has been proposed. These jars are adapted to be revolved around the track so as to bring the jar desired into a readily accessible position adjacent the food storage compartment door opening of the refrigerator. The jars are usually made of clear glass to permit their contents to be viewed from the exterior thereof. Since in prior devices, these glass jars are rotated against and about themselves during the revolving of same around the track, they soon become scratched and nicked to such a degree that their contents can no longer be viewed from the exterior thereof and, therefore, their utility is diminished. The walls of the jars become unsightly and the jars are not used, therefore, they no longer form a permanent part of the food storage arrangement within the refrigerator. The scratching of walls of the glass jars during rotation thereof against each other also causes small pieces of glass to be chipped from their walls, which pieces of glass fall upon or into other foods stored in the refrigerator below the jar track. In addition, the jar or bottle track mounted on a food storage shelf of a refrigerator cabinet, if not constructed to be removable therefrom, ordinarily interferes with the proper storage of other food products on the shelf in the vicinity of the track when jars or containers are not located thereon.

Thus, it is the primary object of my invention to provide an improved revolving food storage container device for a refrigerator which will not be damaged through continued use thereof, to thereby provide a permanent part of the food storage arrangement within the refrigerator.

Another object of my invention is to provide a convenient assembly of parts within a refrigerator for properly cooling food products placed in jars or containers and for permitting the easy removal of the desired jar or container from the refrigerator.

Still another object of my invention is to provide an improved method of and means for supporting and guiding a plurality of food containers within a substantially endless track and to form the track so that it will occupy a minimum amount of space in the food storage compartment of a refrigerator cabinet.

A further object of my invention is to provide a plurality of gliders or the like for the reception and support of glass jars containing food products and adapted to be stored and cooled within the food storage compartment of a refrigerator cabinet and adapted to be revolved around a track provided in the compartment, which gliders act as rollers with respect to one another while revolving the jars.

In carrying out the foregoing objects, it is a still further and more specific object of my invention to provide an improved shelf for the refrigerated compartment of a refrigerator cabinet, which shelf has a track integrally formed therein for the purposes described, and which shelf is flat and substantially smooth in the vicinity of the track portion thereof to provide a flat food supporting surface throughout the entire area of the shelf whereby the track or the flat food supporting surface may be used selectively in the storage of foods in the refrigerator.

Further objects and advantages of the present invention will be apparent from the following description, reference being had to the accompanying drawings, wherein a preferred form of the present invention is clearly shown.

Figure 1:
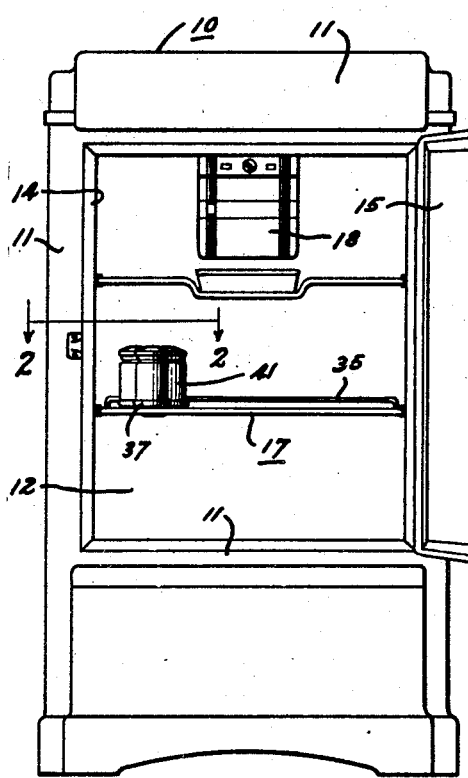
Fig. 1 is a front view of a refrigerator having a jar and track device constructed in accordance with my invention embodied therein.
Figure 2:
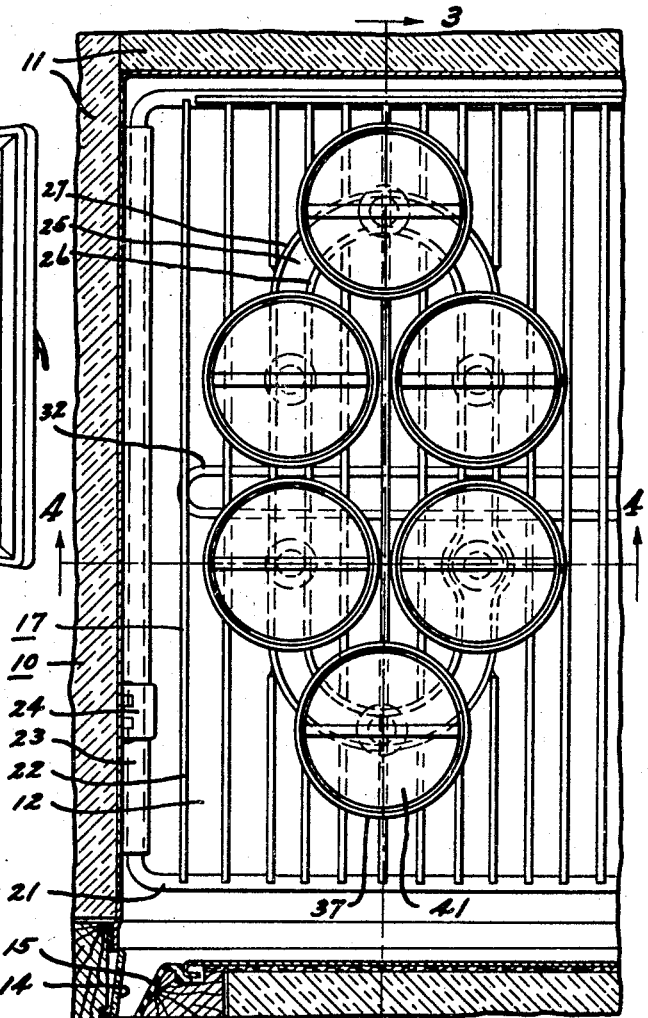
Fig. 2 is a top plan view of the jar and track device, and is taken on the line 2—2 of Fig. 1.

Referring to the drawings, for illustrating the present invention, I have shown in Fig. 1 thereof a refrigerator cabinet 10 having insulated walls 11 forming a food storage space or compartment 12 therein provided with a door opening 14, which is adapted to be closed by a door 15. A plurality of shelves may be horizontally disposed within the compartment 12 and at least one of these shelves, generally represented by the reference character 17, is constructed in accordance with the present invention. The food storage compartment 12 may be cooled by the refrigerating effect produced by an evaporator 18 of a closed refrigerating system including a refrigerant liquefying and condensing unit (not shown) mounted within a machine compartment provided in the cabinet 10 below the food storage compartment 12. The food supporting shelves within the food storage compartment 12 are open or reticulated to permit the air cooled by the evaporator 18 to pass therethrough and circulate throughout the interior of the food compartment.

Figure 3:
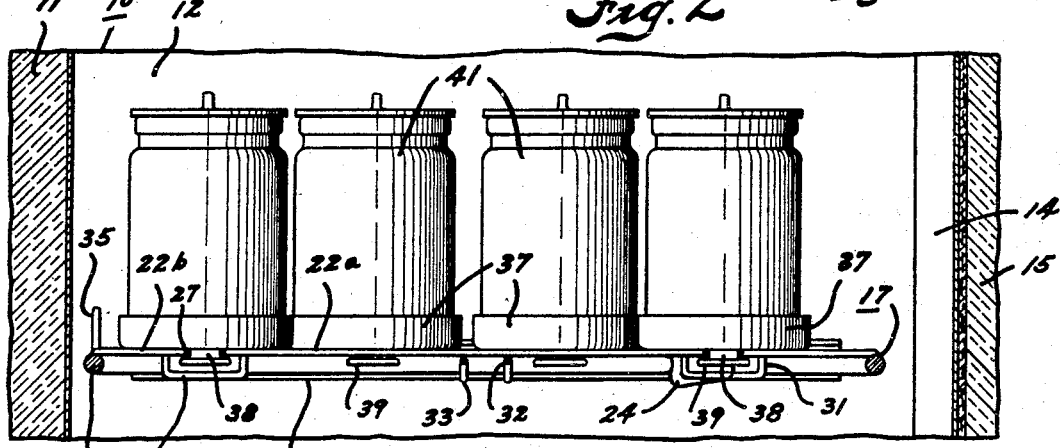
Fig. 3 is a sectional view of the device taken on the line 3—3 of Fig. 2.
Figure 5:
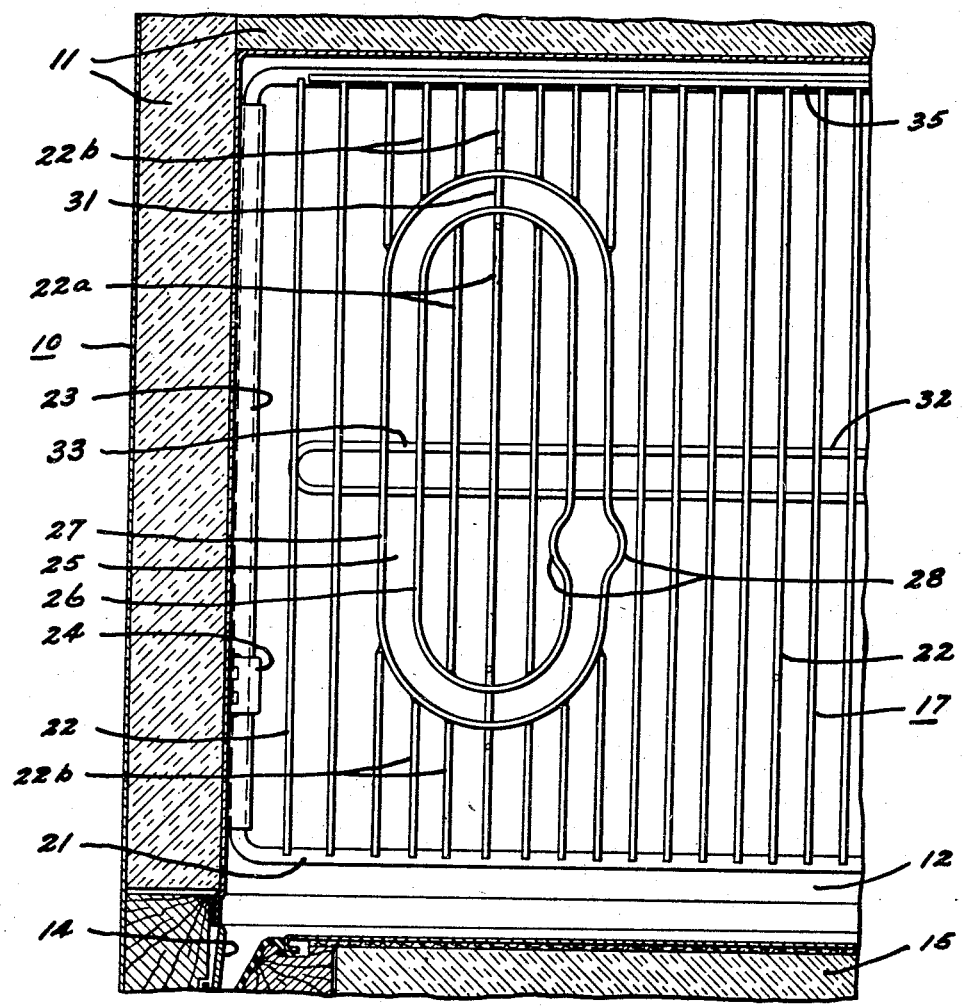
Fig. 5 is a top plan view of the jar track provided in a shelf of the refrigerator cabinet.
Figure 4:
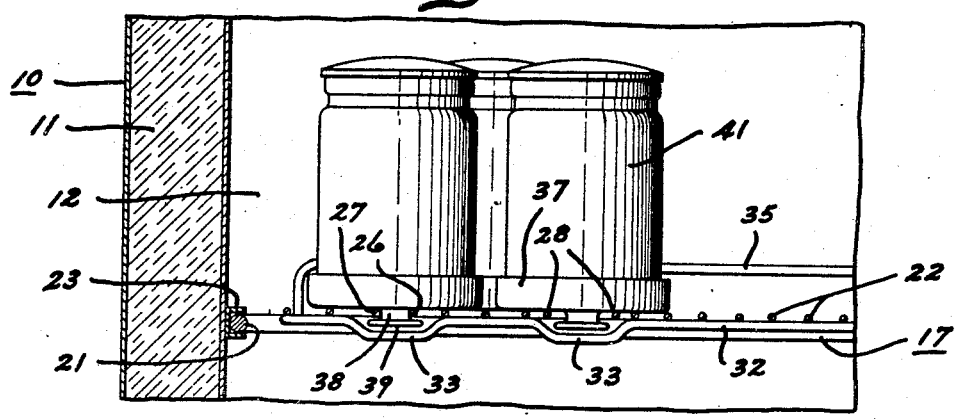
Fig. 4 is another sectional view of the device taken on the line 4—4 of Fig. 2.

The shelf 17 in the present invention comprises a bounding rim 21 having a plurality of substantially parallel cross rods 22 extending between and secured at their ends to the front and back sides of the rim 21 to form a flat smooth food supporting surface for the shelf. The side portions of the rim 21 of shelf 17 are located in U-shaped brackets 23 secured to the wall of food compartment 12 in any suitable or conventional manner. The shelf 17 may be slidable within the brackets 23 and a clip 24 disposed in the path of forward movement of the rear rim portion of the shelf serves as a stop to limit sliding of the shelf. At one side of the shelf 17 there is provided an elongated substantially endless track portion 25 (see Fig. 5) formed by a pair of continuous wires 26 and 27. These wires 26 and 27 have oppositely disposed and registering off-set portions 28 provided therein and forming an entry opening for gliders or the like to be presently described. The wires 26 and 27 are disposed in the same horizontal plane with the cross members 22 of the shelf 17. It will be noted that the cross members 22a secured to and extending between the ends of the loop formed by wire 26 and that the cross members 22b secured to and extending from the wire 27 to the front and rear portions of rim 21 are shorter than the cross wires 22 but are in the same horizontal plane therewith. Thus, wires 26 and 27 and the short cross members 22a and 22b are all disposed in the same horizontal plane to provide the shelf 17 with a flat food supporting surface extending throughout its area. A U-shaped wire portion 31 has one leg thereof secured to the center cross member 22b and has its other leg secured to the center cross member 22a at each end of the track 25 (see Figs. 3 and 5) so as to depend therefrom for increasing the structural strength of the shelf in the vicinity of the track 25. To further increase the structural strength of shelf 17, I place a looped wire 32 below the cross members 22 and 22a horizontally across the central portion of the shelf. This looped wire 32 has off-set or bent down portions 33 adjacent the track 25 (see Figs. 3 and 4) for a purpose to be presently described. If the shelf 17 is slidably mounted relative to the food compartment 12 of cabinet 10, I preferably provide a guard rail 35 along the back of rim 21 of the shelf to prevent food products supported on the shelf from falling therefrom when the shelf is moved.

The track portion 25 of shelf 17 is adapted to receive a plurality of cylindrical gliders or the like 37 of uniform diameter relative to one another and having a cup-like portion disposed above and resting upon the surface of the shelf for the reception and support of a jar, container, bottle or can. Each glider 37 also includes a depending neck portion 38 terminating in an enlarged flange 39. These gliders 37 are formed of a thermo-plastic material, such, for example, as Bakelite, or any other hard molded material, preferably of low coefficient of friction. The enlarged flange portion 39 of gliders 37 are inserted in the enlarged entry opening of track 25, formed by the off-set portions 28 in wires 26 and 27, so that the neck portions 38 thereof fit closely within the walls of the track. The flange 39 on gliders 37 fit under the wires 26 and 27 of track 25 to lock the gliders to the track during the revolving of the same around the track. When the flange 39 on a glider 37 is brought into alignment with the enlarged entry portion 28 of the track, the glider can be readily removed or released from the track by elevating the flange 39 through the entry portion 28.

While I have disclosed a glass jar, or container 41 mounted on each glider 37, and while these jars or containers are of uniform size, it is to be understood that jars, bottles, cans or the like of different diameter relative to one another may be placed in or upon the gliders without impairing the rotatability of the gliders against one another while revolving the jars around the track.

By removing the jars or containers 41 and gliders 37 from the track 25 of shelf 17, the shelf may be employed as a conventional food supporting shelf due to the elements forming the track 25 being disposed in the same horizontal plane with the cross members 22 of the shelf and forming a continuation of the flat smooth shelf food supporting area. Therefore, the shelf 17 of the present invention has a selective use and when the rotating jar device is used, the gliders 37 are rotated against each other to thus prevent marring of the glass jars. By employing the gliders 37, the omission of one or more food storage jars or containers from the device does not necessitate reaching to the rear of the compartment 12 by the operator to rotate other jars or containers. An empty glider positioned at the front of the track 25 adjacent the door opening 14 of the compartment 12 can be pushed to cause all the gliders to revolve about the track until a glider containing the jar to be removed is rotated into a position adjacent the front of the food compartment. This can be accomplished irrespective of the diameter of a jar, container, bottle or can supported on certain of the gliders because the gliders are of uniform diameter and act as rollers with respect to one another to revolve them in either direction around the track. Since the gliders 37 are constructed of molded material and have a hard smooth surface of low coefficient of friction, they increase the ease with which the revolving device can be operated and eliminate the chipping of glass from the jars or containers. Thus, the danger of fine particles of glass falling into other foods stored below the revolving device is eliminated and the walls of the food storage jars or containers remain clear and unscratched to at all times permit their contents to be viewed from the exterior thereof.

It will be seen from the foregoing that I have provided an improved refrigerated food storage arrangement within the food storage compartment of a refrigerator cabinet. The improved food storage arrangement disclosed permits effective air circulation within the food compartment of a refrigerator to thereby efficiently circulate air cooled by the evaporator of a refrigerating system throughout the interior of the compartment and about foods stored therein. Any left over food stored in a jar or container of the revolving device can be readily brought to an easily accessible position adjacent the door opening of the food compartment for removal from the device. The shelf by providing selective use of the revolving jar device or conventional food storage support upon the shelf affords the user a variation in the food storage arrangement within the refrigerator cabinet. Also, the gliders of the revolving device may receive jars or containers of different size relative to one another without impairing the operation of the device. The rotation of the gliders against one another instead of the glass jars being rotated against themselves eliminates the danger of small particles of glass falling into the food products stored below the rotating device in the food storage compartment of the refrigerator.

While the form of embodiment of the present invention as herein disclosed constitutes a preferred form, it is to be understood that other forms might be adopted, all coming within the scope of the claims which follow.

What is claimed is as follows:

1. A shelf for disposition in a food storage compartment of a refrigerator cabinet and reticulated for the passage of air therethrough, said shelf having a flat food supporting surface extending throughout its entire area, means forming a substantially endless track portion in a part of the area of said shelf and at one side thereof for the reception of a plurality of gliders each adapted to support a container, the gliders having means thereon for locking same upon said track portion and acting as rollers with respect to one another whereby a glider may be pushed at the front of the shelf to cause all the gliders to travel around said track portion, said track portion forming a permanent part of the flat food supporting surface of said shelf and having a part thereof formed to permit release of the glider locking means and removal of the gliders from the shelf, and said track portion of said shelf being disposed in substantially the same plane with the food supporting surface thereof and forming an unobstructed continuation of the shelf food supporting surface to render the entire shelf area available for the support of food products thereon when the gliders are removed.

2. A shelf for disposition in a food storage compartment of a refrigerator cabinet and reticulated for the passage of air therethrough, said shelf having a flat food supporting surface extending throughout its entire area, means forming a substantially endless track portion of oval form in planular contour in a part of the area of said shelf and at one side thereof for the reception of a plurality of gliders each adapted to support a container, all of the gliders having means thereon for locking same upon said track portion and being constructed of a material having a low coefficient of friction and being of uniform diameter to act as rollers with respect to one another when positioned in said shell track portion whereby a glider may be pushed at the front of the shelf to cause all the gliders to travel around said track portion, said track portion forming a permanent part of the flat food supporting surface of said shelf and having a part thereof formed to permit release of the glider locking means and removal of the gliders from the shelf, and said oval track portion of said shelf being disposed in substantially the same plane with the food supporting surface thereof and forming an unobstructed continuation of the shelf food supporting surface to render the entire shelf area available for the support of food products when the gliders are removed.

3. A shelf for disposition in a food storage compartment of a refrigerator cabinet and reticulated for the passage of air therethrough, said shelf having a flat food supporting surface, means forming a substantially endless track portion in the flat food supporting surface of said shelf for the reception of a plurality of gliders each adapted to support a container, the gliders having means thereon for locking same upon said track portion and acting as rollers with respect to one another whereby a glider may be pushed to cause all the gliders to travel around said track portion, said track portion forming a permanent part of the flat food supporting surface of said shelf and having a part thereof formed to permit release of the glider locking means and removal of the gliders from the shelf, and said track portion of said shelf being disposed in substantially the same plane with the food supporting surface thereof and forming an unobstructed continuation of said surface to render the entire shelf area available for the support of food products thereon when the gliders are removed.

4. A shelf for disposition in a food storage compartment of a refrigerator cabinet and reticulated for the passage of air therethrough, said shelf having a flat food supporting surface, means forming a substantially endless track portion of oval form in planular contour in the flat food supporting surface of said shelf for the reception of a plurality of gliders each adapted to support a container, the gliders being of cylindrical contour and of uniform diameter so as to act as rollers with respect to one another when positioned in said shell track portion whereby one glider may be pushed to cause all the gliders to travel around said track portion, the gliders having means thereon for locking same upon said track portion, said oval track portion having a width less than twice the diameter of a glider and being in substantially the same plane with and forming a permanent part of the flat food supporting surface of said shelf, said oval track portion having a part thereof formed to permit release of the glider locking means therefrom and removal of the gliders from the shelf, and said oval track portion forming an unobstructed continuation of said food supporting surface to render the entire shelf area available for the support of food products thereon when the cylindrical gliders are removed.

ROBERT N. FEICHT.